Figure 1:
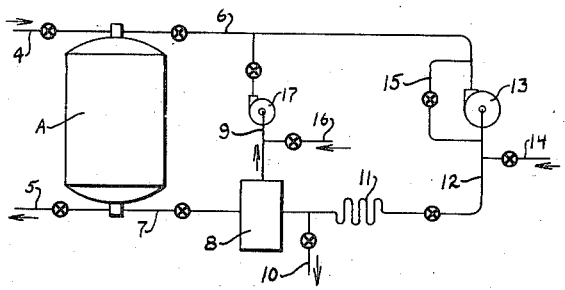

March 16, 1937.  E. J. HOUDRY  2,073,638

APPARATUS FOR REGENERATION OF CONTACT MASSES

Filed April 13, 1932

INVENTOR
EUGENE J. HOUDRY
BY
Ira L. Nickerson
ATTORNEY

Patented Mar. 16, 1937

2,073,638

UNITED STATES PATENT OFFICE 2,073,638

APPARATUS FOR REGENERATION OF CONTACT MASSES

Eugene J. Houdry, Paris, France, assignor to Houdry Process Corporation, Dover, Del., a corporation of Delaware Application April 13, 1932, Serial No. 604,997

1 Claim. (Cl. 23—288)

This invention relates to the removal of contaminating matter from contact masses. In the case of a catalytic mass, loss or impairment of catalytic activity may be due to material left behind in or on the mass after the transformation has been completed. At other times, it may be due at least in part to the tendency of the mass to retain within itself the material already transformed or actually undergoing transformation. With masses which are primarily absorbent, contamination or "poisoning" usually takes the form of clogging of the pores by viscous or other solid or semi solid substances which are removed from the material under treatment as by a filtering operation. The invention contemplates the complete elimination of contaminants and the restoration of the mass to operative condition. It particularly concerns treatment of contact material in situ.

One object of the invention is to devise means for restoring a contaminated mass of contact material to operative condition especially in situ. Another object is to make the transition from normal running operation to regeneration and vice versa, with due consideration to required temperature conditions. Another object is to retrieve and save from loss most, if not all, of the valuable material under treatment which may be in contact with the mass when the latter is to be relieved of contaminants. Still another object is to determine the process steps required for successful regeneration of contact masses by oxidation. Another object includes suitable apparatus for and control of the herein disclosed processes. Further objects will be apparent from the detailed description which follows:

The invention includes the following essential steps: (1) raising or lowering the temperature of the contact mass from that required in normal operation to that required for the purifying or regenerating reaction; (2) supplying the purifying or regenerating medium while maintaining the contact mass at the reaction temperature; (3) purging the mass of the regenerating medium; and (4) restoring the mass to the requisite temperature for normal operation. An advance step may consist in recovering important amounts of material undergoing treatment in contact with or within the contact mass. In practice, certain of the above indicated steps may be combined, as, for example, steps (3) and (4), or the advance step with (1); also, the process may be elaborated by variations in or stage modifications of certain steps as will later appear. For purging the mass of recoverable charge or transformed product, any suitable substance may be used, such, for example, as steam, or an inert gaseous fluid like flue gas, which is substantially devoid of oxygen, or a liquid solvent, such as naphtha. The purging substance may be utilized to make the temperature change indicated in step (1). In regeneration by oxidation, a substance capable of supporting combustion is distributed through the contact mass as, for example, air, and the temperature of the mass is held within the limits necessary to preserve the mass from injury from overheating. This may be accomplished by diluting the air, as required, with a cool or relatively cool inert gaseous material such as steam or flue gas which may be derived from the combustion of the contaminants.

After oxidation is completed, the mass may again be purged by the use of the same or different substances, as in the advance step, thereby to clear the mass of the regenerating medium. The sensible heat of the regeneration reaction may be utilized to make steam, some or all of which may be used in the herein described processes. The apparatus comprises one or more blowers, steam boilers, condensers, separators, and the like, with the necessary controls. These may be arranged to form a circuit which includes the contact mass.

In order to secure uniform results both during normal operation and during regeneration, it is important that the material entering the contact mass be distributed uniformly through the latter, and that insulation be provided to diminish heat losses. If the contact mass is in finely divided state, provision should be made for outlets as well as inlets distributed throughout the mass.

It will be obvious that details of the regenerating process will depend upon the materials undergoing transformation in the normal operation of the contact mass and especially upon the temperature of the reaction. In order to illustrate this, certain typical examples will be discussed.

With a catalytic mass operating normally at a fairly high temperature, as, for example, 800 to 1000° F., as in the vapor phase treatment or transformation of hydrocarbons, such as a petroleum derivative, the regenerating process would involve the following steps: (1) The extraction of oil vapors contained within the contact mass, as by the use of steam; (2) injection of an agent capable of supporting combustion which may be either air alone or diluted with inert gaseous material, such as steam or the fumes resulting from combustion, the injection continuing long enough to bring the mass to the temperature chosen for regeneration, as, for example, from 1000 to 1100° F.; (3) dilution of the oxidizing agent with steam or with the fumes of combustion, so as to take away the excess heat and maintain the mass at the chosen temperature of regeneration until the contaminants are consumed; (4) purging the mass with gaseous material, such as steam, to empty the same of fumes and oxidizing agent and to reduce the temperature of the mass to that of normal operation, as within the range of 800 to 1000° F.

It is to be understood that, for successful operation, the contact mass is in a casing which is well insulated and that the regenerating medium is distributed uniformly and simultaneously throughout the mass at such a temperature that the reaction may take place. The first of the four process steps just described may be omitted, if it is not considered important to recover the products which may be left in the contact mass at the end of a period of normal operation.

When the temperature of the contact mass, during normal operation, is below that at which combustion of the contaminants will occur if air is admitted thereto, it is necessary to raise the temperature of the mass. This may be accomplished by forcing superheated steam through the mass until its temperature is suitable for the start of ignition which may be as low as 400° F., depending upon the material left in the contact mass. Then combustion will start on the admission of fresh air and may be continued at the chosen temperature of regeneration by recirculation of fumes as previously described. In certain cases combustion is started by sending into the mass air alone heated to 350° F. or higher.

In certain relatively low temperature work, such as the liquid phase treatment of a lubricating oil, the catalytic contact mass, after normal operation and before regeneration, will contain, adsorbed in the pores, and absorbed in the structure of the mass, a considerable quantity of oil which may be the same as the feed stock or of improved quality, depending upon the extent of the transformation. It is important to recover this oil, and several methods may be adopted. In one method, the mass is flushed with a solvent, such as naphtha, the solvent, along with the oil, being then recovered by purging the mass with superheated steam. The flow of steam may be continued to bring the temperature of the mass to about 400° F. or more, or hot flue gas may be used for this purpose. Thereafter, the contaminants in the mass may be eliminated by oxidation through the use of air alone or air diluted by flue gas as previously described, the temperature of the flue gas being substantially below the desired range for regeneration and its proportion to the air being high enough so that a sufficiently large proportion of the exothermic heat of regeneration will be removed as sensible heat thereby to maintain the bed of contact material within the desired temperature range, while carrying out the oxidation or regeneration at a rapid rate. A second method omits the use of a solvent and utilizes superheated steam to bring the temperature of the mass to about 650° F., and during this purging operation, practically all of the oil left in the mass is recovered. With the mass thus at a temperature high enough to initiate combustion of the contaminants, regeneration may be effected as previously described. This method may be modified by putting the mass under vacuum while superheated steam is sent through to recover the oil and to raise the temperature of the mass. Still another method involves the use, instead of superheated steam, of a different hot inert gaseous substance, such as flue gas substantially free of oxygen, which may be passed through the mass, with or without the application of a partial vacuum thereto.

Figure 2:
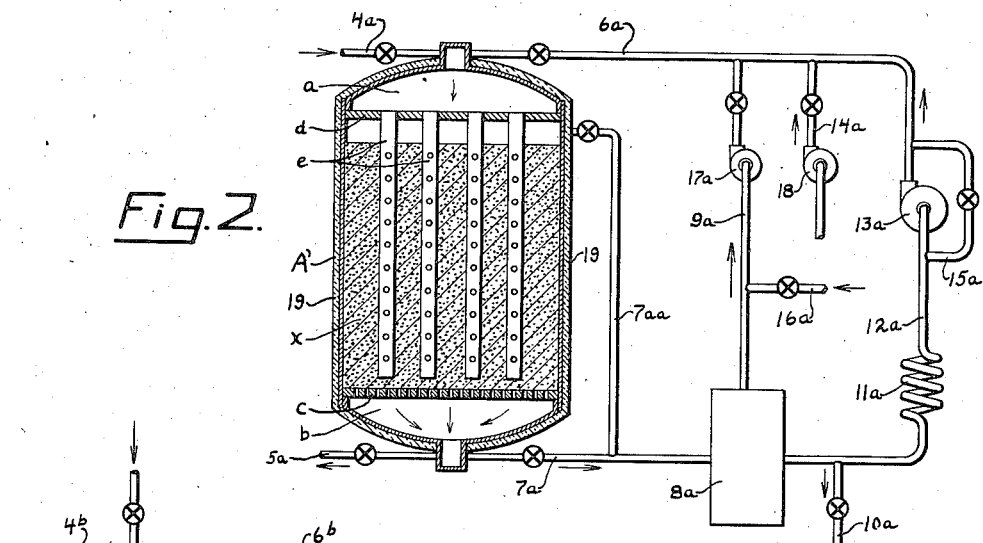
Figure 3:
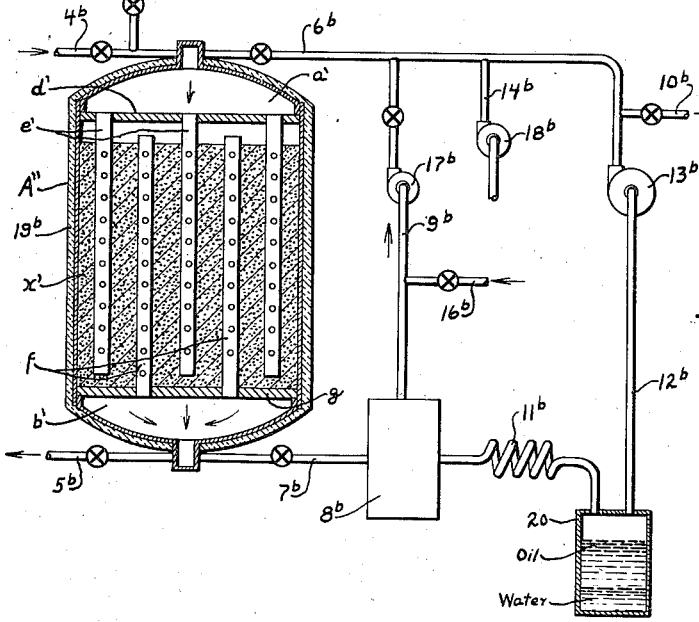

Various forms of apparatus for practicing the above described processes are indicated in the accompanying drawing, in which:

Fig. 1 is a diagrammatic illustration of the apparatus in its simplest form; and Figs. 2 and 3 are modifications of the apparatus largely diagrammatic but showing the container for the contact mass in section.

In Fig. 1, an insulated case A of any suitable or desired type contains a contact mass (not shown). In normal operation, the material to be treated enters through the valved feed inlet 4 and leaves as transformed product by valved outlet 5. The flushing, temperature adjusting and regenerating fluids enter case A by conduit 6 and leave by conduit 7. A boiler 8 utilizes the sensible heat of the fumes to generate steam which may be fed into inlet conduit 6 by connection 9. A portion of the fumes leaving boiler 8 may escape to atmosphere through a valved outlet 10. The remainder is cooled to a suitable temperature by passing through a condenser 11 and thence, by valved connection 12, to a pump or blower 13, which discharges into inlet conduit 6. Air enters the regenerating circuit through a valved inlet 14. An additional control for the regenerating and heat dissipating medium may comprise a valved bypass 15 around blower 13. To provide for preliminary purging of the contact mass before boiler 8 goes into operation, steam from another source may be admitted to steam line 9 through a valved inlet 16. A pressure booster 17 of any suitable or desired type may be inserted in line 9 to overcome the pressure in inlet conduit 6. In this form of the invention, both the oxidizing medium, such as fresh air, and the diluent therefor, steam or flue gas, are forced through the catalytic or other contact mass by a single blower 13.

In the modification of the invention disclosed in Fig. 2, the fresh air inlet 14a is arranged beyond fume recirculating blower 13a and is provided with a separate blower 18. Case A', shown in vertical section, has a coating of insulating material 19, and is provided with an inlet header a into which feed pipes 4a and 6a discharge and with an outlet header b from which discharge conduits 5a and 7a lead. Conduit 7a may have a branch 7aa so that the fumes may be withdrawn from the top of contact mass X as well as from the bottom. The contact mass X is supported on a grid c forming the top of outlet header b. A partition d separates the chamber containing the contact mass from inlet header a and serves to support a series of distributing elements e which extend substantially to grid c and are embedded in contact mass X. Elements e have openings throughout the length thereof and are so arranged within casing A' as to effect distribution of material admitted to header a uniformly throughout contact mass X. With the exception of the separate blower for the fresh air inlet and the branched exhaust connection, the regenerating circuit for case A' conforms to that for case A in Fig. 1, and the various elements thereof are indicated by the same reference numbers accompanied by the letter "a".

Fig. 3 discloses a modification particularly adapted for contact mass X' in finely divided form. Case A", which contains mass X' not only has a series of distributing members e' depending from partition d', but also has a series of outlet elements f which are supported by and open through a lower partition g. With this arrangement fluid entering inlet header a' is simultaneously and uniformly distributed by apertured conduits e' throughout contact mass X', and the products or fumes are received in a substantially parallel flow arrangement by the apertured outlet elements f. While it is to be understood that the regenerating circuits in Figs. 1 and 2 provide suitable separating means for the material or product and water condensed from the steam used for flushing, Fig. 3 indicates a gravity separator 20 located between condenser 11b and recirculating blower 13b, to recover the condensed liquids. Otherwise, the only changes in the regenerating circuit of Fig. 3 as compared with Fig. 2 comprise the omission of the bypass around the recirculating blower and of the exhaust branch to the top of the contact mass and the shifting of the valved outlet 10b for fumes beyond blower 13b. The other elements of the regenerating circuit are indicated by reference numbers corresponding to the numbers used in Figs. 1 and 2, but with the addition of the letter "b".

From an inspection of Figs. 1, 2 and 3, it will be apparent that each of the regenerating circuits therein shown permits the purification and regeneration of a contact mass in accordance with the processes herein described. With the single blower shown in Fig. 1, a greater manipulation of valves will be required to control the temperature of the contact mass during regeneration. With the double blower arrangement disclosed in the regenerating circuits of Figs. 2 and 3, control is simplified, since fresh air blower 18 or 18b may be set to operate at constant speed, while variations in the quantity of fumes is effected by changing the speed of recirculating blower 13a or 13b, or by manipulation of the valve in bypass 15a of Fig. 2 or the valve in vent outlet 10b of Fig. 3, or by both changing the speed of the blower and manipulating the valves. In Fig. 3, the placing of the outlet 10b for fumes beyond blower 13b permits the creation of subatmospheric pressure or a partial vacuum of any desired amount in case A". In contact cases such as those shown in Figs. 2 and 3 in which a considerable amount of metal extends within the contact mass in the form of distributing inlet pipes, it will be apparent that it is necessary to leave the contact mass at a temperature somewhat above the normal operating temperature in order to have the mass at the latter temperature when equilibrium is established.

I claim as my invention:

In apparatus for effecting chemical reactions by the aid of a regenerative contact mass, in combination, a case having a contact mass therein, and regenerating means for said mass providing a circuit including said case, an impeller in said circuit, stage heat extracting means and liquid trapping means in said circuit on the suction side of said impeller including a waste heat boiler, means connected into said circuit on the other side of said impeller for sending a constant volume of an oxidizing medium into said case, means for controlling the quantity of cooled fumes recirculated by said impeller including a vent for the circuit at a point which will enable said impeller to put said case under a partial vacuum but will not interfere with the supplying of the constant volume of oxidizing medium, and means for sending steam from said waste heat boiler and from an outside source into said circuit between said connection for the oxidizing medium and said case.

EUGENE J. HOUDRY.